(12) United States Patent
Tillman

(10) Patent No.: US 10,273,388 B1
(45) Date of Patent: Apr. 30, 2019

(54) COMPOSITE WOOD ADHESIVE

(71) Applicant: PLY-BOND CHEMICALS & MILL SUPPLIES, INC., Virginia Beach, VA (US)

(72) Inventor: Donald N. Tillman, Virginia Beach, VA (US)

(73) Assignee: PLY-BOND CHEMICALS & MILL SUPPLIES, INC., Virginia Beach, VA (US)

( * ) Notice: Subject to any disclaimer, the term of this patent is extended or adjusted under 35 U.S.C. 154(b) by 188 days.

(21) Appl. No.: 15/618,606

(22) Filed: Jun. 9, 2017

Related U.S. Application Data

(60) Continuation-in-part of application No. 14/614,685, filed on Feb. 5, 2015, now abandoned, which is a continuation-in-part of application No. 13/420,059, filed on Mar. 14, 2012, now abandoned, which is a division of application No. 12/456,373, filed on Jun. 16, 2009, now Pat. No. 8,293,821.

(51) Int. Cl.
| | |
|---|---|
| *C09J 11/04* | (2006.01) |
| *C09J 103/02* | (2006.01) |
| *C09J 161/06* | (2006.01) |
| *C09J 11/08* | (2006.01) |
| *C09J 9/00* | (2006.01) |
| *C08L 99/00* | (2006.01) |

(52) U.S. Cl.
CPC ............... *C09J 161/06* (2013.01); *C09J 9/00* (2013.01); *C09J 11/04* (2013.01); *C09J 11/08* (2013.01)

(58) Field of Classification Search
CPC .......... C08L 99/00; C08L 61/06; C08L 97/02; C08L 3/02; C08L 27/18; C08L 89/00; C08L 2666/16; C08L 2666/26; C08L 61/14; C08L 61/34; C09J 103/02; C09J 199/00; C09J 161/06
See application file for complete search history.

(56) References Cited

U.S. PATENT DOCUMENTS

| | | | |
|---|---|---|---|
| 3,775,144 A | 11/1973 | Ware et al. |
| 3,775,145 A | 11/1973 | Ware et al. |
| 3,793,113 A | 2/1974 | Pearson |
| 3,907,728 A | 9/1975 | Lambuth et al. |
| 4,070,314 A | 1/1978 | Alexander et al. |
| 4,082,903 A | 4/1978 | Chow |
| 4,105,606 A | 8/1978 | Forss et al. |
| 4,200,723 A | 4/1980 | Chen |
| 4,400,467 A | 8/1983 | Bauer et al. |
| 4,568,714 A | 2/1986 | Overholt |
| 4,801,631 A | 1/1989 | Sachs et al. |
| 4,941,922 A | 7/1990 | Snyder |
| 4,942,191 A | 7/1990 | Rogers |
| 5,017,319 A | 5/1991 | Shen |
| 5,202,403 A | 4/1993 | Doering |
| 5,459,207 A | 10/1995 | Saigan et al. |
| 5,556,906 A | 9/1996 | Collins et al. |
| 5,609,711 A | 3/1997 | Miller |
| 5,763,509 A | 6/1998 | Eastin et al. |
| 5,895,545 A | 4/1999 | Miller |
| 6,147,206 A | 11/2000 | Doner et al. |
| 6,254,914 B1 | 7/2001 | Singh et al. |
| 6,485,945 B1 | 11/2002 | Potter et al. |
| 6,899,910 B2 | 5/2005 | Johnston et al. |
| 6,962,722 B2 | 11/2005 | Dawley et al. |
| 7,101,691 B2 | 9/2006 | Kinley et al. |
| 2002/0065400 A1 | 5/2002 | Raskin et al. |
| 2002/0132972 A1 | 9/2002 | Giroux et al. |
| 2003/0216492 A1 | 11/2003 | Bowden et al. |
| 2004/0249065 A1 | 12/2004 | Schilling et al. |
| 2005/0101700 A1 | 5/2005 | Riebel |
| 2005/0222358 A1 | 10/2005 | Wescott et al. |
| 2005/0250900 A1 | 11/2005 | Stofko |
| 2006/0147582 A1 | 7/2006 | Riebel |
| 2007/0020476 A1 | 1/2007 | Kintzley et al. |

(Continued)

FOREIGN PATENT DOCUMENTS

| | | |
|---|---|---|
| BR | 7803385 | 12/1979 |
| JP | 56014571 | 2/1981 |
| WO | 2008035042 | 3/2008 |

OTHER PUBLICATIONS

Office Action dated Apr. 6, 2015, in releated U.S. Appl. No. 13/420,113, now abandoned.

(Continued)

*Primary Examiner* — Ling Siu Choi
*Assistant Examiner* — Gennadiy Mesh
(74) *Attorney, Agent, or Firm* — Williams Mullen, P.C.; M. Bruce Harper

(57) ABSTRACT

An improved composite wood adhesive extender, a method of producing such extender, and an adhesive mixture including this extender are provided, wherein the extender has performance satisfactory to the manufacturing needs of composite and plywood products, while also extending the adhesive at a reasonable cost. The adhesive mixture may have a primary and secondary extender. The primary extender is composed of a wood-based product. The secondary extender may be an amylaceous material comprising 100% uncooked flour or starch, or an amylaceous material comprising 100% uncooked flour or starch blended with a high fiber by-product. Alternatively, the secondary extender may be pre-gelatinized flour or starch and a mixture of pre-gelatinized flour or starch with flour comprising an advantageous quantity of raw starch. The secondary extender may substitute for about 25-40% of the primary extender on about a 1:1 ratio basis.

5 Claims, 3 Drawing Sheets

(56) References Cited

U.S. PATENT DOCUMENTS

2007/0036958 A1    2/2007    Hagemann et al.
2007/0148339 A1    6/2007    Wescott et al.

OTHER PUBLICATIONS

Office Action dated Aug. 4, 2014, in related U.S. Appl. No. 13/420,113, now abandoned.

Naidu, Kalpana, et al., "Effects of Ground Corn Particles Size on Ethanol Yield and Thin Stillage Soluble Solids", Cereal Chemistry, 2007, pp. 6-9, vol. 84, No. 1, AACC International, Inc.

Agriculture and Agri-Food Canada, "2. Chapter 2. Current Utilization of Coproducts and Near Coproducts of Ethanol Fermentation fron Grain", Printed Mar. 2, 2007, http://res2.agr.cs/publications/cfar/chsp2_e.htm, 4 pages.

Wang, Ping, et al., Comparison of Raw Starch Hydrolyzing Enzyme with Conventional Liquefaction and Saccharification Enzymes in Dry-Grind Corn Processing, Cereal Chemsitry, 2007, pp. 10-14, vol. 87, No. 1.

Selling, et al., "Nonfood Utilization of Cereal and Soy Based Co-Products", ARS Project, USDA, Agricultural Research Service, 2006 Annual Report, Printed Mar. 2, 2007, www.ars.usda.gov/research/projects/projects.htm, 6 pages.

"S1007: The Science and Engineering for a Biobased Industry and Economy", Annual/Termination Reports (SAES-422), 2004, Printed Mar. 2, 2007, http://nimss.umd.edu/homepages/saes.cfm?trackID=1934, 3 pages.

Donovan, John W., "Phase Transitions of the Starch-Water System", Biopolymers, 1979, pp. 263-275, vol. 18, John Wiley & Sons, Inc.

Office Action dated Sep. 5, 2014, in parent U.S. Appl. No. 13/420,059.

Office Action dated Mar. 7, 2014, in parent U.S. Appl. No. 13/420,059.

Office Action dated Oct. 17, 2011, in parent U.S. Appl. No. 12/456,373.

Office Action dated Dec. 29, 2016, in patent U.S. Appl. No. 14/614,685.

Office Action dated May 11, 2016, in parent U.S. Appl. No. 14/614,685.

Office Action dated Feb. 12, 2008, in the Continuation-in-part, U.S. Appl. No. 11/295,002, of parent U.S. Appl. No. 13/420,059.

Office Action dated Oct. 20, 2008, in the Continuation-in-part, U.S. Appl. No. 11/296,002, of parent U.S. Appl. No. 13/420,059.

Office Action dated Sep. 10, 2007, in the Continuation-in-part, U.S. Appl. No. 11/296,002, of parent U.S. Appl. No. 13/420,059.

Office Action dated May 25, 2007, in the Continuation-in-part, U.S. Appl. No. 11/296,002, of parent U.S. Appl. No. 13/420,059.

COMPOSITE WOOD ADHESIVE

CROSS REFERENCE TO RELATED APPLICATIONS

This application is a continuation-in-part of U.S. patent application Ser. No. 14/614,685, filed Feb. 5, 2015, which is a continuation-in-part of U.S. patent application Ser. No. 13/420,059, filed Mar. 14, 2012, now abandoned, which is a divisional of U.S. patent application Ser. No. 12/456,373, filed Jun. 16, 2009, now issued as U.S. Pat. No. 8,293,821. All the above applications are incorporated herein by reference in their entirety as if fully set forth herein.

FIELD OF THE INVENTION

The invention relates generally to physically modifying mixtures of high fiber materials derived from hulls of cereal grain and legumes, and amylaceous materials through heat moisture treatment using pressure (shear) and heat. The goal is to modify these materials for use as secondary extenders in high pH composite wood products such as phenol-formaldehyde based adhesives.

BACKGROUND OF THE INVENTION

Composite woods products may be described as falling into five classes, each characterized by the treatment of the wood within the product: plywood, oriented strandboard, particleboard, hardboard, and fiberboard. For each class of composite wood, the configuration of the wood contributes to that product's physical properties and typical application. In addition, the adhesive, the density of the wood, and additives such as resin or fire retardants, may change the characteristics of the product.

Most composite woods are made using a thermosetting or heat curing adhesive to bind or hold the cellulose wood fibers together during the process of manufacturing. Commonly used composite wood adhesives or resin binders are formaldehyde, urea-formaldehyde, melamine-formaldehyde, and isocyanate. Phenol-formaldehyde (PF) resins are typically used for manufacturing products that require some degree of exterior exposure durability. These PF resins are manufactured to be used in high pH composite wood products paste formulations, such as at or above a pH of 10. Urea-formaldehyde resins are typically used in manufacturing products where dimensional uniformity and surface smoothness are of more concern than exterior durability (e.g., particleboard). These resins are manufactured to be used in relatively low pH acidic composite wood products paste formulas. Melamine-formaldehyde is an expensive resin used in decorative laminates or paper treatment. Isocyanates, such as di-phenylmethane di-isocyanate (or MDI) are also used in the manufacture of composite wood products. Natural adhesives, such as tannins, can be modified and reacted with formaldehyde to produce resins, as well. The curing characteristics of the resin, such as the cure temperature and time, are also additional factors in the choice of resin. Urea- and phenol formaldehyde resins are most widely used in manufacturing composite wood products.

These resins are expensive and may cause environmental and health problems. Oil shortages contribute to price increases. Formaldehyde is an irritant, a suspected carcinogen, and the resin base may release volatile organic compounds. (Toxicological Profile, ATSDR, DHHS-PHS 1999). In the composite wood industry, the resin is often extended with other materials that add less expensive solids to the paste formulas. These other solids are of two distinctly different types or classes. For clarity, there are extenders that extend a resin and may add tack or active adhesiveness; this contrasts with fillers, which uniformly lack tack or adhesiveness. Extenders may include proteinaceous and amylaceous materials, which provide the active adhesiveness. See Sellers, T., Jr., PLYWOOD AND ADHESIVE TECHNOLOGIES 451 (1985). Fillers may include lignocellulosic materials, such as corncob or alder bark, which do not provide adhesiveness and are recognized as useful as fillers and not extenders without further treatment. Id.; see, also, U.S. Pat. No. 4,942,191 (Col. 12 list of materials identifying corncob and alder bark as non-adhesive "fillers.") An active adhesive extender in this context means a substance capable of extending resin and contributes to holding materials together by adhesion. Sellers, T., Jr., PLYWOOD AND ADHESIVE TECHNOLOGIES 610 (1985).

Secondary extenders are generally less expensive materials that also reduce the cost of the resin, reduce the quantity of primary extenders, and the concentration of any deleterious components. Secondary extenders contribute to pre-press tack and have some adhesive action, but the resin solids are the ultimate adhesive and moisture resistant binder. Any extender should have the correct viscosity, viscosity stability (long pot life), the ability to develop tack, and a certain stickiness. The endosperm from cereal grain, here referred to as cereal grain flour, or legume flour is often used as a secondary extender. It is the endosperm starch that makes a successful secondary extender. The starch gelatinizes at high pH in a predictable and stable manor, thus supplying the needed paste viscosity properties.

Filler is typically an inert organic fibrous material that does not contribute viscosity, or any binding, or adhesive capability. With regard to high pH PF paste formulations, there are only a select few high fibrous materials that meet these criteria. Examples would include walnut shell, pecan shell, and alder, other tree barks, ground corn cob residue. Most other high fibrous material, include cereal grain milling by-products such as corn bran, sorghum bran, oat hulls, barley hulls, rice hulls, and oil seed and legume processing by-products such as soybean hulls, and cottonseed hulls, and pea hulls, cereal grain by-products such as spent brewers grains expelled or extracted corn germ and malt husks, will swell in the presence of caustic in a high pH phenol formaldehyde formula. The swelling of such materials make them unfit for use as a filler in higher pH adhesive mixtures. However, such materials may work quite well in low pH or acidic paste formulas. It is primarily the fiber in these high fiber materials that does the swelling making them unfit. Attached proteins in some high fibrous materials, especially attached legume protein, also swells in the presence of caustic, further making these high fiber materials unfit to use as a filler in a high pH paste formula.

Some flour extenders known in the field include casein, starch, oil cakes, corn flour, corn gluten protein, seed gums, and primarily wheat flour. Legume flours such as pea, check pea, lentil, broad bean, peanut and soybean might also be considered. These cereal grain and legume flours are the main finished products from the dry milling, wet milling, or bean crushing processes. Secondary extenders made from ground whole cereal grain or legume may contain small amounts of hull and germ which contain most of the fibrous material. Whole grain corn flour may contain approximately 12.4% fiber. Whole pea flour may contain 5.9% fiber (Rodgers table 1). So fiber material in whole grain or legume flour that incorporate the bran and germ world typically be below 15% of total dry weigh composition. Secondary extenders made from whole cereal grain or whole legume, if used as a 100% of the secondary extender, would bring no more than 15% high fiber material to the total weigh of the secondary extender. In some cases, wheat and other flours or materials may be mixed. The combination of gluten or protein and starch in wheat flour appears to aid in the adhesiveness or tack of the final mixture, making it one of the most widely used extenders. Yet wheat flour, although cheaper than resin, is still relatively expensive compared to many other natural alternatives. Wheat flour in the high pH caustic PF resin formula is also somewhat unpredictable or variable. The proteins in wheat flour at high pH can cause stringing and lumping of the adhesive mixture, and accumulation or build-up of glue on spray tips or other equipment, necessitating frequent cleaning. Unmodified native proteins in general can also cause problems with viscosity stability. Unmodified soy protein is particularly unstable at high pH, causing short pot live. Thus, some have sought natural alternatives, such as fiber byproducts mixed with starch, but with limited commercial acceptance.

The term "fiber" is here defined as a polysaccharide that cannot be digested by alpha or beta amylase enzymes. Most commonly in the aforesaid high fiber materials are cellulose, hemicelluloses, and lignin along with certain organic acid. Typical tests to measure the amounts of these material present in high fiber, or fibrous material are crude fiber, acid detergent fiber (ADF), neutral detergent fiber (NDF), and total dietary fiber (TDF). For the purpose herein, total dietary fiber (TDF) is used to define the term fiber. The TDF in high fibrous materials or components can range from 50% to 95%, with 65% to 85% most typical.

The same shortcomings that make the use of most high fiber by-products from cereal grain, oil seed, or other legume processing unacceptable for use as an extender or filler in high pH paste formulas, also make high fibrous materials unacceptable for use as a secondary extender in amount more than about 10% by d.b. weight of the secondary extender. In this context, as noted above, 50% or more TDF may be considered to be a high fiber material or component.

It would be desirable to provide an adhesive, secondary adhesive extenders and mixture thereof for use in high pH PF resin composite wood products satisfactory to the performance and manufacturing needs, as well as a method for the production and use of such an adhesive or adhesive extender in the manufacture of composite wood products. High fiber materials, however, may be inexpensive—which would render their use otherwise attractive, should their drawbacks be overcome. Accordingly, a cost effect and simple approach to enable the use of such materials as extenders is desirable.

SUMMARY OF THE INVENTION

A substance is provided for the manufacture of composite wood products. As described above, adhesives made using high pH PF paste used in manufacturing composite wood products may be extended by the use of soy bean, wheat, or corn flour. Most of this use has centered on wheat flour for its adhesiveness and ease of use, despite higher cost, stringing, and lumping. In the present approach, high pH PF resin composite wood adhesive may be extended by a secondary extender, which may comprise a mixture of heat moisture treated amylaceous cereal grain flower or legume flour with 5-60% of the high fiber by-product, This mixture is 100% heat moisture treated by extrusion producing about 65-75% unaffected starch, about 25-35% partially or fully gelatinized and/or melted starch, 100% denatured protein, denatured fibrous material and other polysaccharides, and hydrolyzed fibrous material and other polysaccharides. In the present approach, an adhesive made with the secondary extender is disclosed which has demonstrated acceptable adhesiveness, viscosity, viscosity stability (pot life), and cleaner performance. It has been also been surprisingly discovered that a secondary extender having a 25%-40% of high fiber by-product which would normally not produce a secondary extender with the required viscosity properties, mixed with raw cereal grain flours or legume flour, is, by heat moisture treating this mixture by co-extrusion, produces the same or better benefits of a secondary extender comprising raw untreated amylaceous cereal grain flour or legume flour. The benefit of this discovery is that the secondary extender containing the heat moisture treated by co-extrusion mixture of high fiber by-product and amylaceous material that has all the properties of a successful secondary extender that include good viscosity, good viscosity stability, and good pot life. This is unexpected because the fiber in high fiber co-products from cereal grain and legumes, and legume proteins by themselves typically swell to excess, producing pastes using these materials in either a filler, or secondary extender exhibiting very poor viscosity, and viscosity control and stability in the high pH environment of PF resin based paste formulas.

The term "heat moisture treatment" is commonly used to describe a process whereby native unmodified raw starch (or protein) is treated under controlled conditions of pressure, mechanical shear, heat and added moisture. Conditions being such that the native raw starch can undergo a range of physical modifications such as gelatinizing, partial gelatinization, varying degrees of melting. Heat moisture treatment can also be applied to milled whole cereal grain or legume flour. In this case, other components of the amylaceous cereal grain and legume flour which are other proteins, fibrous material, primarily cellulose, hemicelluloses, and lignin, are also affected by heat moisture treatment. These components can be hydrolyzed, and denatured (molecular shape changes), and enrobed by melted starch. All of these changes modify the functionality of the starting raw unmodified amylaceous cereal grain or legume flour after heat moisture treatment.

Sometimes heat moisture treatment is referred to as cooking. The term cooking usually implies an excess of water in the cooking process. This is not the case in the heat moisture treatment embodied in the present approach. Cooking also implies starch gelatinization; it is not an object of this approach to solely gelatinize some or all of the starch. However, it is desirable to create a range of degraded or denatured particles, of various compositions, the mix of which imparts the bulk properties such as viscosity, including viscosity stability over time, which is central to the invention.

A method that may be used to heat moisture treat materials is extrusion. Co-extrusion is mixing two different materials together before or during extrusion, with the product one or more co-extrudates. The extruder may be operated with an objective of providing controlled moisture, pressure, temperature, and throughput of the high fiber by-product and amylaceous materials such that the end product is a heterogeneous mass or mixture comprising a blend of raw starch, gelled starch, raw protein, denatured protein, hydrolyzed protein, enrobed protein, raw fiber, denatured fiber, hydrolyzed fiber, enrobed fiber, lignin, and polysaccharide.

For clarity, extrusion differs in many ways from screw mixers, in that screw mixers typically do not affect pressure and temperature, and the lack of a die plate means that there will be no degradation of the material. In other words, a screw mixer may mix various materials, but will not effect any heat moisture treatment.

An extruder may be operated to provide optimum mechanical energy and minimum thermal energy input to produce the correct relative amounts of each of these different forms of materials, resulting in the required bulk properties that produce a successful secondary extender. Moisture content of the starting materials may be adjusted by adding water prior to introducing the starting materials into the extruder and/or by water injection into the barrel of the extruder. A die plate at the end of the extruder having a variable orifice, or a pre-selected fixed orifice, may be used as the means to control the desired pressure at the die plate within a predetermined range. Pressure and temperature at the die plate may also be controlled by screw configuration, screw speed, the rate of feed into the extruder, added steam in the barrel, and the composition of the materials in the extruder. When the heat/moisture treated product exits the die orifice typically at a temperature above the boiling point of water, the water flashes off as steam, thus reducing moisture content, and minimizing or eliminating the need for further downstream drying.

Products of this approach may further be dried and/or ground or milled to a fine power provide that the conditions of drying, grinding or milling are selected so as to avoid further product alteration that changes the functionality of the finished product. Conventional drying such as belt driers, fluid bed dryer, flash dryers can be used. Conventional grinding or milling equipment can also be employed such as a Bauermeister grinding mill. The material is typically ground down to minus U.S. 80 mesh.

A method for manufacturing composite wood adhesive extenders is also provided, as well as an adhesive mixture. In one embodiment of the present invention, a method of manufacturing a composite wood adhesive is provided. The method includes the step of providing amylaceous cereal grain flour or legume flour and. a high fiber by-product, and mixing the amylaceous material and the high fiber by-product. The method also includes heat moisture treating by co-extruding the high fiber component with the amylaceous material, such that the extruded mixture comprises a mixture of about 25-40% of the high fiber material by-product to form a secondary extender producing about 65-75% of unaffected raw native starch, about 25-35% partially or fully gelatinized and or melted starch. 100% denatured protein, and partially denatured fibrous material and other polysaccharides, and partially hydrolyzed fibrous material and other polysaccharides. The method further comprises providing about 60-80% of at least one resin, about 3-10% of a primary extender comprising walnut shell, pecan shell, alder bark, coconut shell or the fibrous dry substance remaining after furfural production, about 12-18% added water and about 1-5% of at least one caustic, and mixing the secondary extender, the at least one resin, the primary extender, the water and the at least one caustic to form the composite wood adhesive.

In yet another embodiment, method includes the step of providing a secondary extender which comprising a mixture of amylaceous materials, some of which may be separately heat moisture treated and 100% heat moisture treated high fibrous material. The amylaceous materials includes about 15-40% of a degraded heat moisture treated first flour or starch and about 60-85% of a second flour or starch, wherein the first flour or starch is substantially free of raw starch and the second flour or starch is substantially uncooked, and wherein the first flour or starch and the second flour or starch comprise less than about 25% moisture. The method further comprises providing about 60-80% of at least one resin, about 3-10% of a primary extender comprising walnut shell, pecan shell, alder bark, coconut shell or the fibrous dry substance remaining after furfural production, about 12-18% added water and about 1-5% of at least one caustic, and mixing the secondary extender, the at least one resin, the primary extender, the water and the at least one caustic to form the composite wood adhesive.

Additional objects and advantages of embodiments of the invention will be set forth in part in the description which follows, and in part will be obvious from the description, or may be learned by practice of the invention. The objects and advantages of the invention will be obtained by means of instrumentalities in combinations particularly pointed out in the appended claims.

DETAILED DESCRIPTION OF THE PREFERRED EMBODIMENTS

Figure 1:
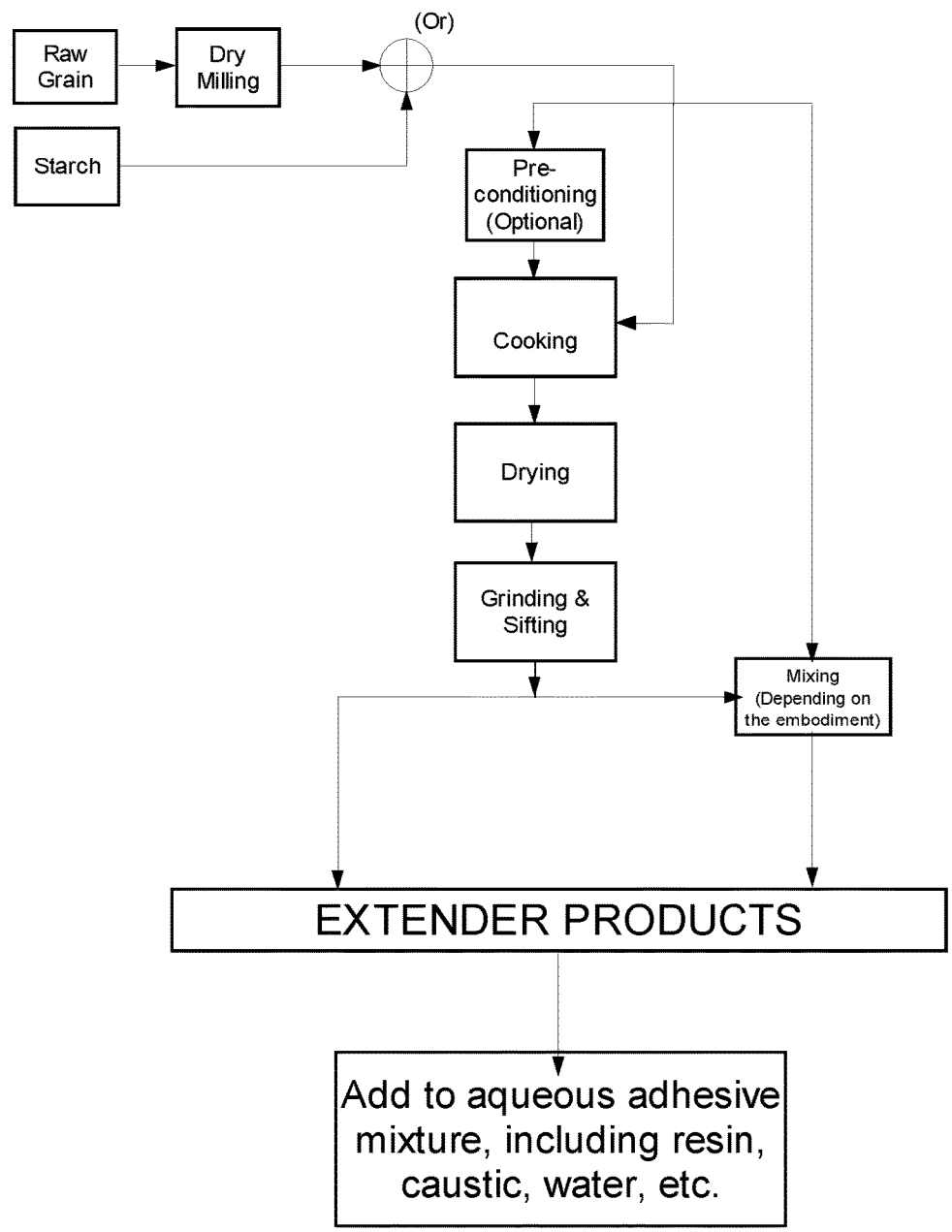
FIG. 1 is a block diagram of a process to produce a composite wood adhesive extender.

The manufacturing of wood composite products varies considerably, depending on the type of product and the configuration desired. The manufacture of plywood may be considered illustrative for an embodiment of the present invention. Plywood refers to wood panels glued together under pressure. Typically, the grain within the wood panels is altered to enhance the strength and dimensional stability of the panels. The grain of the faces or outer plies is typically oriented longitudinally. Plywood often incorporates a core or inner ply of veneer, lumber, or particle board, such that the number of layers is commonly odd. The grain of the core plies runs parallel to the face plies. The adherence of the plies within a panel plays a large role in the successful performance of the panel. In order to test the sufficiency of the adhesive at the interface between the panels, it is typical to measure the wood failure at the bonded joints. Wood failure is measured by the area of wood fiber remaining at the glue line following completion of a specified shear test. In the present invention, the adhesive may produce a composite wood having a wood failure of at least 75%, or more specifically, at least 80%.

To manufacture plywood, sheets of veneer are cut into the desired dimensions, and dried to an acceptable moisture content, if necessary. An adhesive mixture may then be applied to the veneer plies by spray, roller, foaming, curtain coating, hand, etc. Spray application is commonly used to achieve consistent and thorough application. The veneer plies are then mechanically or manually placed together in a "lay up" step, which orients the grain of the different plies. Assembled panels then enter a cold pre-press to establish contact between the adhesive and the veneer plies, and to level or flatten the plies. The panels are then transferred to a hot press for thermosetting of the resin within the adhesive mixture.

The adhesive mixture and panels are preferably to be of an appropriate moisture content; too much moisture may lead to the formation of steam during the hot press step, which can bubble or escape, damaging the panel. Excessive moisture can also interfere with the resin cure times. The adhesive mixture is preferably sufficiently tacky after the cold pre-press step in order to prevent separation of the plies prior to the panel reaching the hot press step; however, the adhesive mixture should not be so viscous as to create manufacturing problems during application. Further, the adhesive mixture must be sufficiently liquid so as to enable even application or spraying and to promote bonding with the wood, but not so thin as to introduce too much moisture, to flow off the panel, or to over penetrate.

As noted previously, flours are used as conventional extenders within wood adhesive mixtures. Flour is a finely ground meal produced by milling the seeds or fruit of various cereals or other plants. Common types of flour are wheat, corn, rice, oat, soybean, buckwheat, barley, rye, triticale, etc. Milling typically, but not necessarily, involves removing the bran and germ portions of the kernel or grain from the starchy endosperm. The combination of gluten protein and starch in wheat flour appears to aid in the adhesiveness or tack of the final mixture, while the viscosity of wheat flour is appropriate for the manufacturing process. However, the protein in wheat may contribute to cleanliness problems, as discussed above. Standard corn or pea flour has also been used to replace some portion of wheat flour; however, standard corn flour by itself lacks sufficient adhesiveness for acceptable performance in the step between the cold pre-press and the hot press.

Introduction

One aspect of the present approach is an adhesive for use in composite wood products. The adhesive may comprise of a combination of a resin, water, caustic, a primary extender and a secondary extender. The resin of the present invention may be present in the amount of about 60-80% and may comprise any resin known in the art to function at high pH (greater than 10, but commonly 12 or more), including but not limited to, phenyl-formaldehyde resin, The content of the resin solids in the adhesive mixture may comprise about 25-35%, more specifically 28-32% solids content.

The added water of the present invention may be present in the amount of about 12-18%, which does not include the water present in other compounds in the adhesive mixture, such as the water present in the resin. The caustic may be present in the amount of about 1-5%, or more specifically, about 2-4%. The caustic may comprise caustic soda (NaOH), calcium hydroxide or any compound chemically similar to caustic soda, such as caustic alcohol ($C_2H_5ONa$). The caustic of the present invention may comprise about 50% solids. Optionally, the adhesive may comprise about 0-1% soda ash.

Primary and secondary extenders are also disclosed and may be included in the adhesive of the present invention. As noted above, extenders may be included to reduce the costs of the adhesive and add particulate matter to the mixture. The adhesive may include a primary extender in the amount of about 3-10%, or more specifically, about 4-10%. Alternatively, the primary extender may comprise about 3-6%, since the secondary extender may substitute for about 25-40% of the primary extender at about a 1:1 ratio basis. The primary extender may include various cellulosic or wood based products, including but not limited to, walnut shells, pecan shells, alder bark, and coconut shells, as well as fibrous substances remaining after furfural production. In some embodiments, the secondary extender may be an active adhesive material. One exemplary aspect of the present approach is an active adhesive secondary extender for use in the adhesive mixture, which may be present in an amount of about 5-15% by weight of the adhesive. The secondary extender is an attempt to maximize the use of inexpensive high fiber component without damaging performance. The secondary extender may include a first and second component co-extruded at temperatures ranging from 200-400° F., die pressures 50-2000 PSI, and screw speed from 100-600 to form a co-extrudate, as further detailed herein. The first component is a high fiber material and is generally 25-40% of the co-extrudate. For clarity, the fibrous or high fiber material itself is generally greater than about 50% total dietary fiber. Above 40% of the first component, the secondary extender exhibits poor viscosity stability and short pot life. Below 25%, the addition of high fiber material is not justified economically. The second component may be amylaceous material, such that the co-extrudate is a heterogenous heat moisture treated mixture. The mixture may be a desirable blend of raw starch, gelled starch, raw protein, denatured protein, hydrolyzed protein, enrobed protein, raw fiber, denatured fiber, hydrolyzed fiber, enrobed fiber, lignin, and polysaccharides. As selection for the first component, it may be desirably selected from a group consisting of soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation, and/or mixtures thereof.

The heat moisture treated first component or high fiber by-product may typically be derived from cereal grain, with such materials having more than about 50% fiber (i.e., being high fiber material). This first component may be present in the amount of about 25-40% of the secondary extender. The heat moisture treated high fiber by-product may comprise soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation, and/or mixtures thereof. In some embodiments, the high fiber byproduct may comprise up to 60% fiber, largely based on hull fiber (as opposed to both cell wall and hull fiber), and when processed as described herein, without undesirable high viscosity and shortened pot life.

The heat moisture treated high fiber by-product of the present invention provides functionally, physically modified fiber, protein, and starch, wherein the fiber and protein can act as a low viscosity substitute for a portion of the primary extender with good tack (adhesiveness) from the dissolved fiber fragments. The functionally modified high fiber by-product protein may be present in an amount of preferably about 0.5-5% of the adhesive, but with a maximum protein of about 12.8% (e.g., about 8% protein for corn flour, 16% for fiber material, at a 60% substitution ratio) which is an amount sufficient to offset some resin, but not so much to cause viscosity and pot life problems. This is in contrast with conventional approaches, which often use materials containing a minimum of about 20% protein.

Co-extrusion for heat moisture treating permits an advantageous concentration or maximizing of denatured protein, fiber, and pre-gelatinized starch. Conventional wheat or pea based adhesive pastes may exhibit viscosities on the order of about 3000-4000 centipoise or greater at the five-day point; in contrast, embodiments of the present approach may often be on the order of about 2000-2500 centipoise at the same point.

It is an object of this approach that co-extrusion of the high fiber component with amylaceous material denatures the fibrous material and protein in the high fiber component, it is also believed that the hemicellulose in the fiber portion is affected later, in that the hemicellulose is dissolved by the high pH of the plywood resin mixture, which may be about 10 or more, to produce by hydrolysis small fiber fragments that have viscosity properties that are similar to the viscosity properties of the primary extender. It is further believed that the formation of the small fragments of fiber caused by the high pH of the mixture allow the fiber to better react with the resin in the claimed invention, thereby forming a better mechanical lock and may participate with chemical bonding to form moisture resistant bonds, as the adhesive mixture cures in the presence of heat and pressure, as shown in U.S. Pat. Nos. 6,518,387 and 7,416,598, which are incorporated herein by reference in their entireties. For purposes of this invention, moisture resistant adhesives are adhesives capable of bonding composite wood in a manner to have a panel average of 80% wood failure or greater when tested in accordance with a boiling test. The boiling test includes boiling test specimens in water for 4 hours, which are then dried for 20 hours at a temperature of 63±3° C. with sufficient air circulation to lower moisture content of the specimens to a maximum of 8%. The specimens are boiled again for a period of 4 hours, cooled in water, and tested while wet by tension loading to failure in a shear testing machine operated at a maximum head travel of 406 mm (16 inches) per minute. Jaws of the machine securely grip the specimens so there is no slippage. The percentage of wood failure is then determined with specimens in a dry condition and evaluated.

Denaturing of the protein and certain of the by-products of the high fiber component, including soy protein, during co-extrusion causes the protein to form long linear chains, which delays the reaction of the protein with the resin in the plywood adhesive mixture. This has the benefit of reducing the viscosity growth over time and allows for a shorter pot life associated with the use of protein, particularly soy protein, in the adhesive mixture.

It is also believed that the protein from the amylaceous cereal grain material in the secondary extender shrink as they are denatured during the co-extrusion process. Most of the protein in the amylaceous cereal grain material may comprise storage proteins, such as prolamins which may, in the case of corn, comprise primarily zein. It is believed that the shrinkage of the protein allows the material to be more inert, and act more as a filler, with regard to the resin, itself and any other carbohydrates present in the mixture. This inert property has the benefit of reducing or eliminating any plugging or other build-up problems associated with other proteins, such as wheat protein. It is believed that it also helps to eliminate viscosity stability and pot life problems associated with an excess of protein. The unique mixture of the proportions discovered allows the secondary extender to substitute for a portion of the primary extender and the resin, which reduces costs associated with the adhesive mixture. This is because the first and second components co-extruded exhibit active adhesiveness, as opposed to an inactive filler. In one embodiment, this essentially allows for the secondary extender to substitute for a portion of the primary extender. For example, in one embodiment, the secondary extender may substitute for about 25-40% of the primary extender on a 1:1 ratio basis, while exhibiting the same beneficial qualities as if no substitution had occurred. This is beneficial since prices in the industry may fluctuate for the primary extender or secondary extender materials, which would allow the product to be made the most cost effectively and exhibit the same or better qualities.

In an alternative embodiment, the secondary extender may comprise first and second components, such as an amylaceous cereal grain plus heat moisture treated high fibrous material comprising of a mixture of about 25-40% of a physically modified by heat moisture treatment degraded pre-gelatinized first flour or starch that is substantially free of raw starch and about 25-60% of a second raw unmodified flour or starch that is not heat moisture treated, and about 25-60% a third high fiber material that has been physically modified by heat moisture treatment, dried, and ground back to a flour. Material which has been dried and ground back to a flour, a material termed pre-gelatinized flour.

Pre-gelatinized flours have historically been rejected for use as extenders because of the additional processing steps, workability, and perception of increased cost. However, the process described herein produces a secondary extender at a competitive cost and effective performance, while reducing the expense to the end users of cleaning caused by the stringing, lumping, and buildup of conventional flour extenders.

Under evaluation, embodiments of 65% resin adhesive paste prepared in laboratory with soy hull and/or corn hull fibers substituting for 40% of the pecan shell produced viscosity resulted in 1,000 to 1,500 centipoise initial viscosity. The viscosity grew to about 2,000 to 2,800 centipoise stable viscosity after about 36 hours. Viscosities were generally higher if a legume, such as the soy hull, was introduced and increased. The chemistry of the legume or soy hull is such that the soy protein remaining with the hull can covalently bond with the phenol-formaldehyde. Unlike corn protein, which tends to collapse upon itself in the presence of high pH, soy protein will unfold in high pH. This reveals reactive amino acids that cross-link with the resin. This could lead to a reduction in the percent resin in the adhesive paste formula. A further trade off with soy protein is a higher paste viscosity, paste viscosity growth over time, and in general, a shorter pot life A baseline embodiment measure of high resin (about 75% weight), high primary extender (about 10% weight 100% pecan shell), and low secondary extender (about 5% of secondary extenders of the present approach) produced a low baseline initial viscosity at 487 centipoise. As noted above, the introduction of soy generally would increase viscosity. However, the secondary extenders of the present approach could be increased to a combined extender portion of 15% weight, with a corresponding decrease in resin to 65%, for example, with a 36 hour viscosity under 2,500 centipoise, so long as the quantity of soy or other legume substitution was limited, and the viscosity of materials such as pecan shell are taken into consideration.

Producing Embodiments of the Secondary Extender

Figure 2:
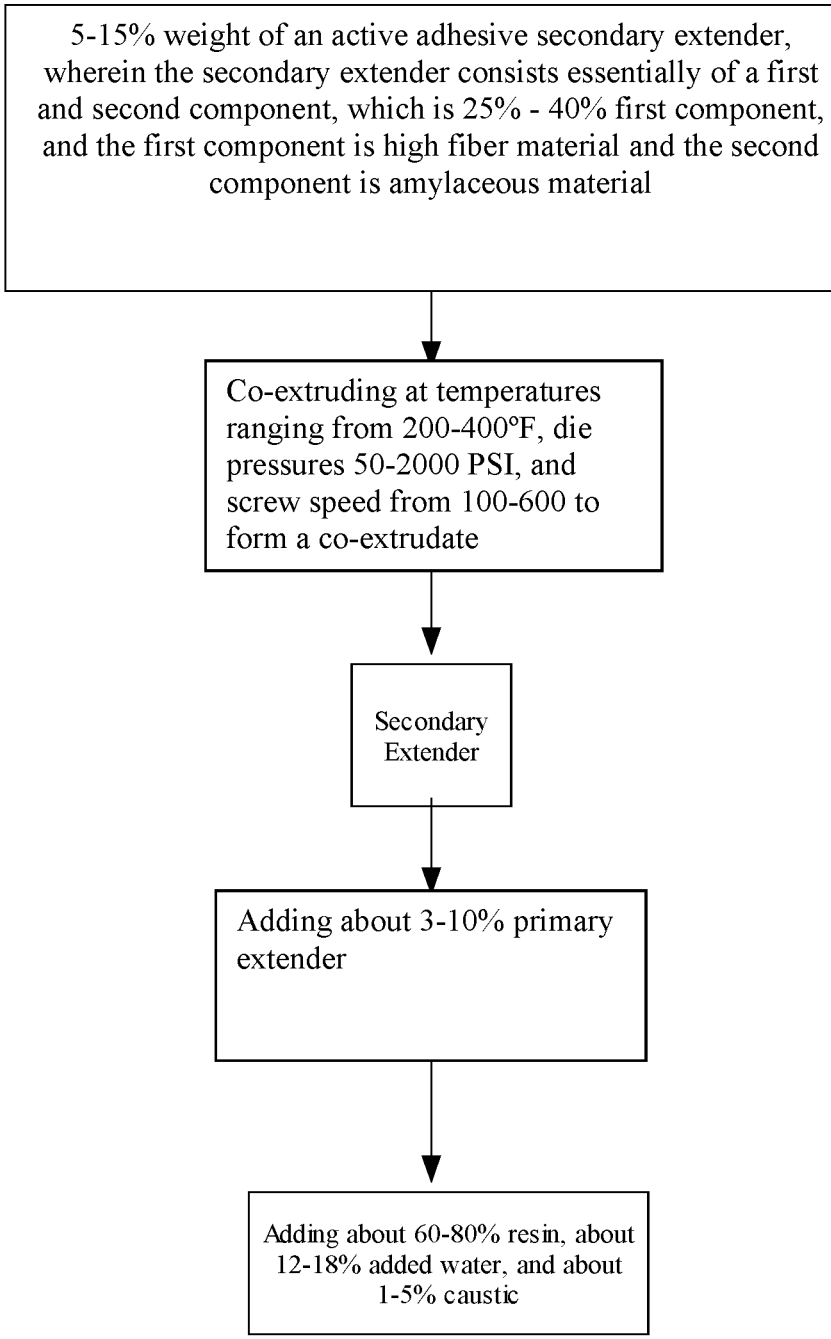
FIG. 2 is a block diagram of a process to produce a composite wood adhesive.

An example of a process to produce embodiments of extenders is shown in the flow chart of FIG. 1. A process to produce an adhesive including or comprising the secondary extender is shown in FIG. 2. As discussed, embodiments of a secondary extender may comprise 1) a mixture of first component high fiber by-product and a second component amylaceous material of flour or starch, or alternatively, may comprise 2) a mixture of flour or starch, and pre-gelatinized flour or starch.

FIG. 2 is a chart illustrating a process or method for preparing embodiments of a moisture resistant composite wood adhesive of the present approach. This figure illustrates preparation of the second and first extender, where the second extender may be substituted for 25-40% of the primary extender at about a 1:1 ratio basis. Ultimately, the adhesive includes 60-80% weight phenol-formaldehyde resin at or above a pH of 10; 12-18% weight added water; 1-5% weight caustic; 3-10% weight of primary extender, with the primary extender comprising a cellulosic or wood-based product; and 5-15% weight of the active adhesive secondary extender. As shown in the first and second blocks, the secondary extender consists essentially of a first and second component co-extruded at temperatures ranging from 200-400° F., die pressures 50-2000 PSI, and screw speed from 100-600 to form a co-extrudate, wherein the co-extrudate comprises 25%-40% of the first component. The first component is a high fiber material and the second component is any amylaceous material. The co-extrudate is a heterogenous heat moisture treated mixture comprising a blend of raw starch, gelled starch, raw protein, denatured protein, hydrolyzed protein, enrobed protein, raw fiber, denatured fiber, hydrolyzed fiber, enrobed fiber, lignin, and polysaccharides. As noted above, the first component is chosen from a group consisting of soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation and/or mixtures thereof.

In other embodiments, the process for producing the secondary amylaceous material may comprise a mixture of amylaceous cereal grain material or component of up to 100% substantially raw uncooked flour or starch with a high fiber material or component by-product begins with mixing the amylaceous material and the high fiber-by product. The amylaceous material comprises about 60-75% and the high fiber by-product comprises about 25-40% of the secondary extender. The high fiber component may include soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation or mixtures thereof. The high fiber by-products may comprise about 12-17% protein and above 50% fiber, and comprise a mixture of fine and coarse particles. It is also believed that the amount of protein, particularly legume protein, in the high fiber by-product helps to bond free formaldehyde in the adhesive mixture. The high fiber by-product of the present approach may be ground to obtain a desired particle size to increase the bulk density to reduce transport cost and to help the initial blending before further processing with the amylaceous material in the secondary extender. In general, the mixture may be a desirable blend of raw starch, gelled starch, raw protein, denatured protein, hydrolyzed protein, enrobed protein, raw fiber, denatured fiber, hydrolyzed fiber, enrobed fiber, lignin, and polysaccharides.

The high fiber component by-product and amylaceous cereal grain material may be stored in bins for future production. The high fiber by-product component and amylaceous cereal grain or legume component or material may be metered out of their respective storage bins with variable frequency drives (VFDs) to give the proper ratio of materials during production. The high fiber by-product and amylaceous material may be dropped through airlocks into separate pneumatic dilute phase air convey transport systems. Both streams may be passed through a turbilizer under controlled conditions to blend the product before it passes to a surge bin ahead of the extrusion process. Optionally, the product may be blended for about 15 minutes and sent to storage. The blend of high fiber by-product and amylaceous material may be stored for a short time in a hopper ahead of the device for moisture heat treatment, such as an Anderson Expander-Extruder-Cooker made by Anderson International Corp., Cleveland, Ohio.

The mixture may be preconditioned or heat moisture treated in a grain expander, in some embodiments, at about 150-250° F. with the pressure of the die at about 50-300 PSI, which produces a composition having about 65-75% unaffected starch or flour, and about 25-35% partially or full cooked starch or flour, denatured protein, hydrolyzed protein, hydrolyzed fiber, denatured fiber, and starch enrobed fiber and protein. The blend may optionally be pre-conditioned in a mixing chamber with water to raise the moisture in a uniform manor before extrusion. Then the mixture of materials may be treated or worked at elevated temperatures and pressures, by extrusion through a die.

It is believed that the controlled heat moisture treatment of the amylaceous material and high fiber by-product impacts the viscosity characteristics of the finished product. The treatment of the product may be controlled by observing the consistency with a Bostwick consistometer, which is a device used for measuring the consistency and/or flowability of various materials.

In one embodiment, the high fiber by-product comprises soy hull. Soy hulls are a by-product of soy flour production. The process of soy hull production begins by roasting the soybeans to inactivate certain harmful enzymes, such as urease. Then the soybeans are cooled and cracked producing hulls, grits, and flour. During the roasting process, pieces of the hull or outer seed coat detaches and are aspirated by passing air through the cracked material. This entrains the lighter hull pieces in the air stream, lifting them away from the denser soy grits, which may be ground to a fine powder or extracted to obtain soybean oil.

Without being bound to any particular theory, it is also believed that extruding the amylaceous material and the high fiber by-product produces unexpected benefits with regards to production of the product. For example, co-extruding the products reduces wear on processing equipment. The high fiber by-product of the present invention typically has embedded nodules, such as silicon nodules, which cause wear on equipment during subsequent grinding of the product. Accordingly, extruding the amylaceous material and the high fiber by-product together reduces wear by enrobing the nodules with the amylaceous material. It has also been found that extrusion of the amylaceous material and the high fiber by-product eliminates any separation issues with the product, which increases the efficiency of the subsequent handling and grinding.

The process for producing the secondary amylaceous material comprising a mixture of raw uncooked flour or starch, and pre-gelatinized flour or starch begins with the amylaceous material, such as starch or raw flour, which is dry milled. The size of dry milled flour is commonly between 20-100 U.S. mesh. The size may vary depending on the mixture of the final product, as discussed further below. Typically, dry milled flours will have low moisture, such as 10-12%, and preserve the endosperm intact. High moisture flours may be unstable during processing. Preferably, the fat content of the flour is low (e.g., less than about 3%) to avoid the potential of saponification.

Starches may be from a wide variety of sources, such as corn, sorghum, cassava, soy, potato, barley, oats, or wheat. Flours for heat moisture treatment or pre-gelatinization may be corn, sorghum, cassava, soy, or wheat. Raw flours added to heat moisture treatment or pre-gelatinized material may be corn, cassava, sorghum, or similar flours having water insoluble proteins, avoiding the water soluble and fibrous proteins found in flours such as wheat or barley. Corn flour has shown good performance and predictable, consistent quality.

The heat moisture treatment step may include one of a number of low moisture methods. As noted above, heat moisture treatment is generally a treatment to mechanically degrade, cook, or melt the the mixture of amylaceous material and high fiber material, and produce a product that will hydrate faster and build viscosity more quickly and at generally lower temperatures. The This mixture may optionally be preconditioned in a mixing chamber with warm water and steam (150-200° F.) to begin a preliminary extrusion process. Then the flour or starch may be treated or worked at elevated temperature by extruding through a die. For example, extrusion may be undertaken at temperatures ranging from 200-400° F. with a die pressures 50-2000 PSI and screw speed from 100-600 RPM. Good results for corn flour were achieved with extrusion at 250-350° F., 200-1200 PSI die pressure, and 200-300 RPM. For that embodiment, water was added at the input of the extruder so that the moisture of the flour was typically under about 25%, preferably about 16-25%. Different extruders will accommodate different characteristics, so other temperatures, pressures, screw speeds, moisture content, and screw configurations may be appropriate.

The extruder physically modifies the amylaceous material and changes its molecular structure by friction and shear, which degrades the starch polymer components. The amylaceous material and high fiber by-product are mechanically pressed through the die, which is a small orifice, by the extruder's internal screw. As the output of the extruder exits an end orifice at above the boiling point of water, the material expands or puffs in a fashion similar to popcorn, and the steam is flashed off. This pre-gelatinized material is then dried and transferred to a grinding and sifting process to create a fine powder that when hydrated has superior binding characteristics. The pre-gelatinized flour or starch is ground on the order of −100 mesh. Such grinding preferably renders the material labile to caustic.

As starch gelatinization temperatures are reached in the extruder, there will be a melting and gelling of the starch into a homogeneous mass, while protein and fiber are typically denatured. The output may be sampled to determine the level of starch cooking by using a Rapid Visco Analyzer (RVA). Other approaches may be used to determine the extent of starch cook, such as differential scanning calorimetry may be used to determine the extent of starch cook.

Figure 3:
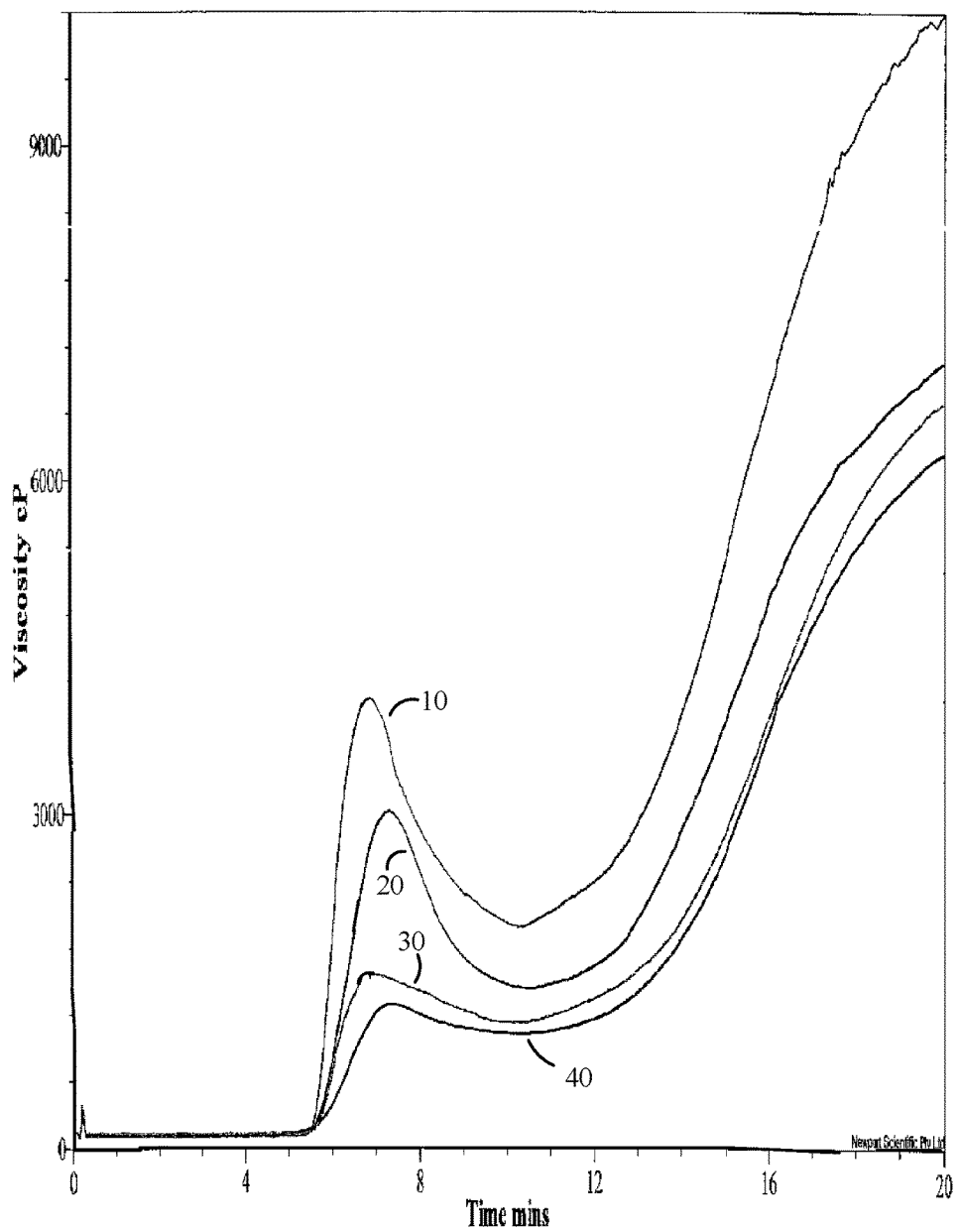
FIG. 3 is a plot of the Rapid Visco Analyzer results for four materials.

FIG. 3 is an RVA plot showing the viscosity of various materials using a common pre-gel protocol. This protocol involved mixing a material with water and heating it from 25° C. to 90° C. at about the five minute point, maintaining 90° C. for about ten minutes to cause 100% gelatinization, then dropping the temperature to 20° C. and adding more water. Line 10 for raw corn flour exhibits the highest profile with a significant starch gelatinization peak, which is followed by a thinning minimum and then a setback increase. Line 20 shows the behavior of a conventional extender of a mixture of 65% raw corn flour and 35% wheat flour.

Extruded or cooked starch will produce a lower RVA viscosity profile than raw starch. As noted above, preferably for this embodiment, the amylaceous material and high fiber by-product are substantially cooked or melted, leaving little or no raw starch. Accordingly, a material having no raw starch would show a low viscosity profile and would lack a gelatinization peak. From a manufacturing perspective, this renders the entire batch useful. The ground pre-gel powder should generally have a film forming capacity, and forms a relatively sticky substance with significant tack. An adhesion or "sticky" test on a range of 1 to 10 using 20 grams of pre-gel mixed into 35 ml of water will demonstrate film forming capacity at 6; preferably, the pre-gel powder will measure about 8 or above.

Those skilled in the field will readily see that other low-moisture methods of treating a starch or flour for pre-gelatinization may be used. For example, an expander/extruder (single or multiple screw) may be used to heat the amylaceous material or high fiber by-product while under pressure, whether as a batch or a continuous process. Alternatively, a low moisture dry roasting process may be used, possibly in combination with the addition of acid to produce dextrin, which may then be mixed with flour. Other approaches may include puffing, heat treating with a turbilizer mixer, high shear paddle mixer, or a plow mixer in order to degrade the starch. In general, a dry or low moisture process is preferable because a wet or high moisture process will require drying to remove the added moisture.

Optionally, an additional processing step may include mixing untreated starch or flour with the pre-gelatinized amylaceous material and/or high fiber by-product. As noted above, flours similar to corn flour may be used for this purpose and include cassava, sorghum, or other flour having water insoluble proteins, avoiding the water soluble and fibrous proteins found in flours such as wheat or barley. Of course, starches lack protein; starches may include corn, sorghum, cassava, soy, potato, barley, oats, or wheat. The raw starch or flour is ground to a fineness grade appropriate for the adhesive spray nozzles or other mechanism and appropriate for proper hydration of the extender. The preferable range of overall extender grind is −100 to +300 mesh.

The ratio of the mixture of corn flour to pre-gelatinized flour or starch in the amylaceous material is preferably adapted to the manufacturing process and the needs of the composite wood product. In the illustrative example of extenders for plywood adhesive mixtures, viscosity, tack, and moisture content are important factors. The balance or ratio of flour to pre-gelatinized starch or flour affects the adhesiveness and viscosity. For example, for embodiments of the invention employed with plywood manufacturing, a secondary extender mixture having 15-40% pre-gelatinized corn flour mixed with standard corn flour provided sufficient adhesiveness or tack in the step between cold pre-press and hot press, along with acceptable levels of viscosity. Line 30 in FIG. 3 illustrates the viscosity for a mixture of 65% corn flour and 35% pre-gelatinized corn flour. A Vacuum Pressure Test on southern pine plywood made with an adhesive mixture extended with 65% corn flour and 35% pre-gelatinized corn flour showed a 2% increase in wood failure (i.e., a decrease in adhesive failure) over an adhesive extended with a blend of wheat flour and corn flour.

An alternative embodiment of the amylaceous material of the secondary extender involves a starch or flour (i.e., corn flour or similar, such as cassava, sorghum, or soy) passed through the treatment for pre-gelatinization, but with an output having 15-40% cooked starch and 85-60% raw starch. For this embodiment, no flour need be added after the pre-gelatinization treatment. For example, corn flour may be treated within an extruder with an output of pre-gelatinized corn flour from the extruder having 15-40% cooked starch. Line 40 in FIG. 3 illustrates the viscosity for an extender of this embodiment having about 65% raw starch and 35% cooked starch. The output is then ground on the order of −100 mesh. Of course, the final viscosity, tack, and moisture content of the extender should be appropriate for the contemplated application.

Extending Wood Adhesive Mixtures

The adhesive of the present invention may be processed as known in the art. In one embodiment, the resin may be added at different steps of processing the adhesive. However, additional of a portion of the resin at the beginning of the process may lower the viscosity as compared to a process of adding the resin at a later step. It is believed that addition of a portion of the resin at the beginning of the process helps to stabilizes the high fiber by-product, which ultimately leads to an adhesive product having a lower viscosity. For example, the adhesive may be processed by combining the water at about 100-130° F. and about 30-40% of the total resin in a mixer and blended for about three minutes. The secondary extender may be subsequently added to the blend.

Next, the primary extender may be added to the blend followed by about a five to ten minute mix time. Caustic may be subsequently added to the blend and mixed for about fifteen minutes, which may increase the blend to a pH of about 8-12. Optionally, soda ash may be blended into the mixture after the caustic. Finally, the remaining about 60-70% of the total resin may be added to the blend to complete the adhesive mixture. While it is believed that the foregoing steps of addition of the various ingredients comprise one method of addition, one skilled in the art may modify the steps of addition depending on desired characteristics of the finished adhesive product. Additionally, one of ordinary skill in the art may modify the process to add all ingredients without timed holds.

The adhesive mixture may be blended for a total time of about one to two hours. The foregoing components of the adhesive mixture may be heated to a desired temperature to aid in the dispersion or digestion of the components into the mixture. Optionally, digestion of the materials may be increased using timed holds, which are intermediate durations of time in between mix times in which the mixer ceases mixing to allow the ingredients to better disperse or digest to form the adhesive mixture. Until the adhesive is used, it may be stored and placed in a recycle system to control the viscosity. For example, the finished adhesive product may optionally have a viscosity of 800 to 2,000 centipoises at a temperature of about 20-35° C. With the use of a low shear stirred tank with a recycle, the adhesive of the present invention may maintain a viscosity of 1,500 to 3,000 centipoises after 72 hours holding time at about 20-35° C. Alternatively, the adhesive may be processed in high shear systems.

As noted above, the adhesive mixed with the extenders may be sprayed onto composite wood or wood plies, so the extenders should be adapted to the apparatus of a pressurized sprayer; an adhesive mixture of too high viscosity may impede mixture flow or damage equipment. When the wood plies exit the cold press, the adhesive mixture should be able to retain adhesion among the various plies in the panel. The extender may contribute a portion of the bonding force between plies, but the adhesive resin is the primary source of bonding force. Thus, the present invention involves preparation of an embodiment of the extender and mixing the extender with the adhesive; thus, the extender is intended to be incorporated into a manufacturing process for composite wood products, such as plywood, with only minor changes familiar to those of ordinary skill in the field.

The adhesive mixture of the present invention is preferably water resistant. While the resin in the claimed invention is typically inherently water resistant, the addition of the remaining ingredients does not substantially diminish the water-resistance properties of the resin and produces a finished adhesive product which is also water resistant.

Each application or use of the present invention will introduce factors that are peculiar to that manufacturing process. Spinning disk resin applicators used in the manufacture of particle composites may require a viscosity different from that required for the manufacture of plywood. Further, the composite wood product, and its intended use, will introduce additional performance requirements. For example, particle board may require a higher concentration of resin to bind the smaller wood pieces into the finished product. Nevertheless, the present invention contemplates the requirements of adhesiveness and viscosity to be among the primary determining factors for most manufacturing processes. Other materials may be added to adapt to variations in manufacture process or product use.

The total quantity of the primary and secondary extenders added to a resin mixture will depend primarily on the minimum amount of resin solids required for effective bonding. The mixture may vary by type of wood (softwood or hardwood), wood product application, method of manufacture, and manufacturer. The mixture for southern pine plywood adhesive may comprise about 42-44% dry solids and about 56-58% added water. Of the dry solids content, a typical weight percent of extenders may be about 11.8-14.5%, with resin solids comprising about 27-32%, and caustic soda (e.g., NaOH) about 2.7-3.2%. In contrast, hardwood plywood mixtures may have a solids weight percent of 56.6% extender.

The actual resin mixing process will depend on a wide variety of factors known to those skilled in the art. Some of these factors include the composite wood product, ambient conditions, the resin mixture constituents, mixture ratios, moisture content, required viscosity, intended resin delivery mechanism, etc. In general, flour based extenders should be wetted prior to addition of caustic. The mixing process may be adjusted in order of steps, timing, quantities, temperature, etc. by those skilled in the art to adapt the process to the particular needs of the intended application.

In practice, an adhesive mixture extended by the corn flour and pre-gelatinized corn flour embodiment rendered the overall adhesive mixture much cleaner than adhesive mixtures extended by wheat flour and corn flour blends. The quantity of glue build up and stringing of adhesive was significantly reduced. In one day of operating a plywood manufacturing facility, daily cleaning time of the spray booth area was reduced by about 50%.

The following specific examples are set forth to more fully describe but are not intended to limit the scope of the invention. Adhesive mixtures were made according to the following specifications, exhibiting consistent quality with respect to viscosity and granulation and passed plywood manufacturing facility quality standards.

Example 1

|  | Weight Percent |
|---|---|
| Resin | 74.42 |
| Water | 11.64 |
| Caustic | 3.00 |
| Primary Extender | 4.16 |
| Secondary extender | 6.23 |
| Soda Ash | 0.56 |

Example 2

|                   | Weight Percent |
|-------------------|----------------|
| Resin             | 65             |
| Water             | 17.2           |
| Caustic           | 3              |
| Primary Extender  | 6              |
| Secondary extender| 9              |
| Soda Ash          | 0.56           |

Example 3

|                   | Weight Percent |
|-------------------|----------------|
| Resin             | 65             |
| Water             | 17.2           |
| Caustic           | 3              |
| Primary Extender  | 4.7            |
| Secondary extender| 9.73           |
| Soda Ash          | 0.5            |

Example 4

|                   | Weight Percent |
|-------------------|----------------|
| Resin             | 65             |
| Water             | 18             |
| Caustic           | 3              |
| Primary Extender  | 5.3            |
| Secondary extender| 8.7            |

Example 5

|                   | Weight Percent |
|-------------------|----------------|
| Resin             | 65             |
| Water             | 18             |
| Caustic           | 3              |
| Primary Extender  | 4.4            |
| Secondary extender| 9.6            |

Example 6

|                   | Weight Percent |
|-------------------|----------------|
| Resin             | 74.4           |
| Water             | 11.7           |
| Caustic           | 3              |
| Primary Extender  | 4.6            |
| Secondary extender| 6.2            |

While the description above refers to particular embodiments of the present invention, it will be understood that many modifications may be made without departing from the spirit thereof. For example, at the time of invention, corn flour was less expensive than wheat flour; relative prices may also change among suitable flours. The present invention expressly includes a wide variety of starches and other flours, such as sorghum, cassava, or others that exhibit similar characteristics to that of corn and could provide inexpensive alternatives to high demand products for that particular agricultural season. The above description is intended to cover such modifications as would fall within the true scope and spirit of the present invention.

What is claimed is:

1. A moisture resistant composite wood adhesive having a first extender and a secondary extender, wherein the secondary extender, optionally substituted for 25-40% of a primary extender at about a 1:1 ratio basis, the adhesive comprising: 60-80% weight phenol-formaldehyde resin at or above a pH of 10; 12-18% weight added water; 1-5% weight caustic; 3-10% weight of the primary extender, with the primary extender comprising a cellulosic or wood-based product; 5-15% weight of the adhesive secondary extender, wherein the secondary extender consists essentially of a first and second component co-extruded at temperatures ranging from 200-400° F., die pressures 50-2000 PSI, and screw speed from 100-600 to form a co-extrudate, wherein the co-extrudate comprises 25%-40% of the first component, and the first component is high fiber material and the second component is amylaceous material, so that the co-extrudate is a heterogenous heat moisture treated mixture comprising a blend of raw starch, gelled starch, raw protein, denatured protein, hydrolyzed protein, enrobed protein, raw fiber, denatured fiber, hydrolyzed fiber, enrobed fiber, lignin, and polysaccharides, and wherein the first component is chosen from a group consisting of soybean hull, corn hull, wheat hull, oat hull, sorghum hull, cotton seed hull, malt husks, extracted corn germ, rice hull, rice bran, spent distillers grain, spent brewers grain, spent solids from cellulosic fermentation, and mixtures thereof.

2. The moisture resistant composite wood adhesive of claim 1, wherein the caustic comprises sodium hydroxide or calcium hydroxide.

3. The moisture resistant composite wood adhesive of claim 1, wherein the cellulosic or wood based product is chosen from the group consisting of walnut shell, pecan shell, alder bark, coconut shell and the fibrous dry substance remaining after furfural production.

4. The moisture resistant composite wood adhesive of claim 3, wherein the secondary extender further comprises an amylaceous material consisting essentially of a first flour or first starch which is substantially uncooked comprising less than about 25% moisture, and wherein the adhesive comprises 3-6% weight primary extender.

5. The moisture resistant composite wood adhesive of claim 1, wherein the die pressures ranges from 100-300 PSI.

* * * * *